March 28, 1961 P. G. S. MERO 2,977,059

TAPE WINDING APPARATUS

Filed Nov. 24, 1958 3 Sheets-Sheet 1

INVENTOR.

Peter G. S. Mero

BY: Olson & Trexler

Attys.

TAPE WINDING APPARATUS

Filed Nov. 24, 1958 3 Sheets-Sheet 2

INVENTOR.
Peter G. S. Mero
BY: Olson & Trexler
Attys.

TAPE WINDING APPARATUS

Filed Nov. 24, 1958 3 Sheets-Sheet 3

INVENTOR.
Peter G. S. Mero
BY: Olson & Trexler
Attys.

United States Patent Office 2,977,059

Patented Mar. 28, 1961

2,977,059

TAPE WINDING APPARATUS

Peter G. S. Mero, Winnetka, Ill., assignor to Comptometer Corporation, Chicago, Ill., a corporation of Illinois Filed Nov. 24, 1958, Ser. No. 775,861

8 Claims. (Cl. 242—55.11)

This invention relates in general to tape winding apparatus and in particular to tape winding apparatus for use in winding the perforated tape employed in printing telegraphy systems.

In tape winders previously employed in printing telegraphy systems, the transmitted tape is conventionally wound on a reel which is driven by a motor through the medium of a friction clutch. In a device of this nature, when tape is not being stepped out of the transmitter, the friction clutch slips and the reel stops rotating. In these prior art tape winders employing a friction clutch, the amount of tension on the tape required to cause the clutch to slip decreases as the diameter of the wound tape roll increases. As a result, the tape is wound more tightly at the center of the roll than at the outside thereof. When chadless tape is employed, the looser winding of the outermost layers of tape requires a take up reel as much as 50% larger than the supply reel which originally held the same amount of tape. In addition to the storage problems incurred by use of oversize reels, the loose wound nature of the tape makes removing the roll from the reel rather difficult.

It is therefore an object of the present invention to provide improved tape winding apparatus which overcomes the prior art limitations by winding tape under substantially uniform tension.

Another object of the present invention is to provide tape winding apparatus characterized by ease in removing the tape from the winding reel.

A further object of the invention is to provide a tape winder which achieves constant tension on the tape as it enters the reel regardless of the size of the wound roll of tape.

Further objects and features of the invention pertain to the particular structure and arrangements whereby the above objects are obtained.

The structure in accordance with the invention includes a pair of flanges joined together by a twist-lock arrangement to form a reel, a plurality of permanent magnets for securing the reel to a pulley, and a motor driving the pulley intermittently according to the tension in the tape being wound.

The invention both as to its structure and mode of operation will be better understood by reference to the following disclosure and drawings forming a part thereof wherein.

Figures 1, 2:
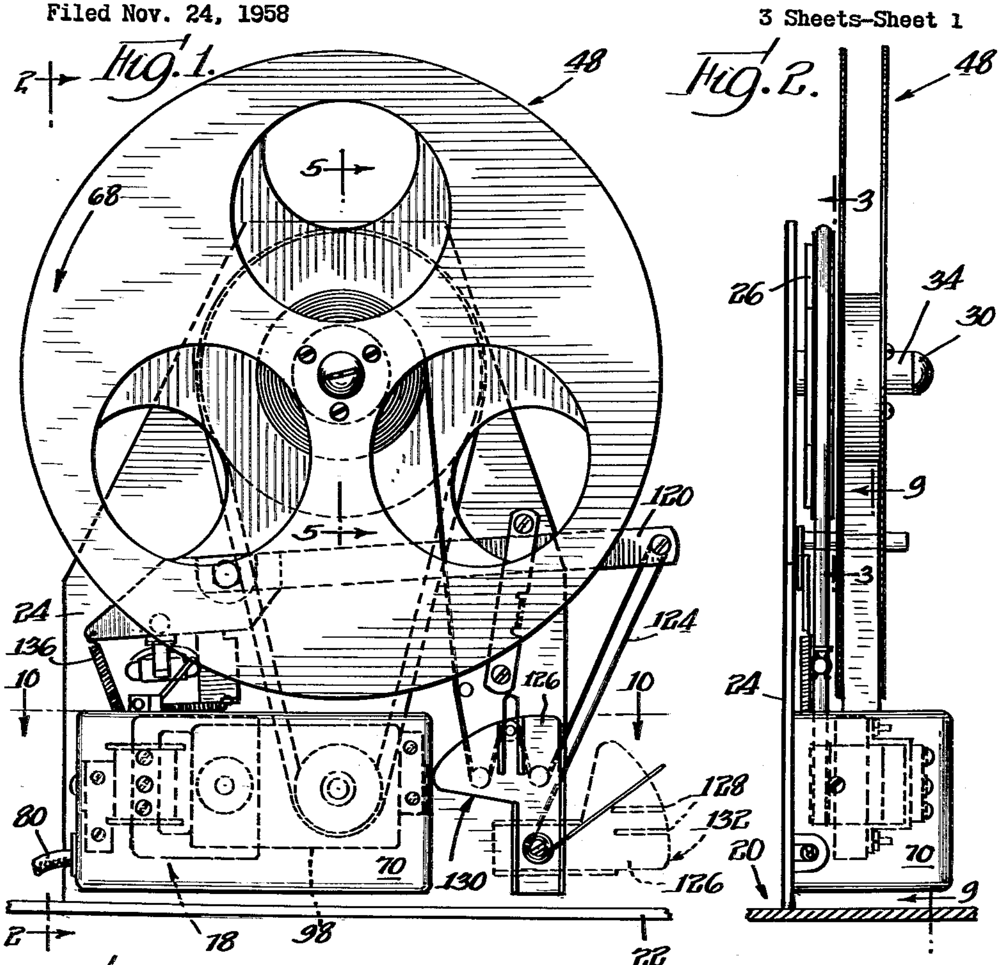
Fig. 1 is a front view of tape winding apparatus in accordance with the invention.
Fig. 2 is a side view of the tape winding apparatus shown in Fig. 1 as taken along the line 2—2 in Fig. 1.
Figure 3:
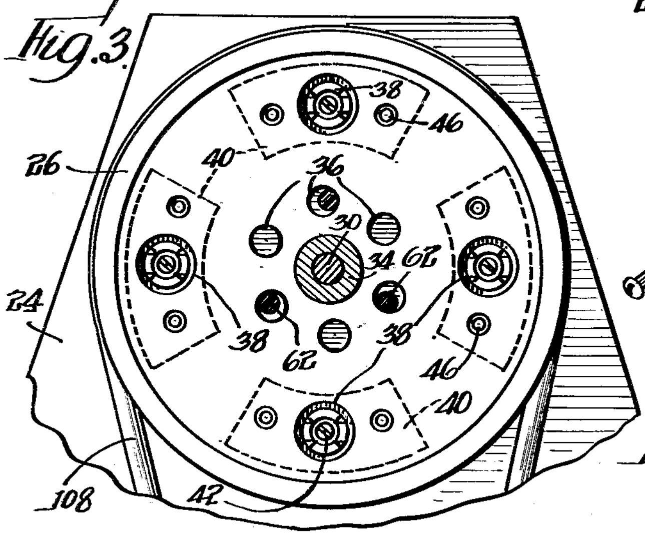
Fig. 3 is an enlarged, fragmentary view of the magnet arrangement used in mounting the reel.
Figure 4:
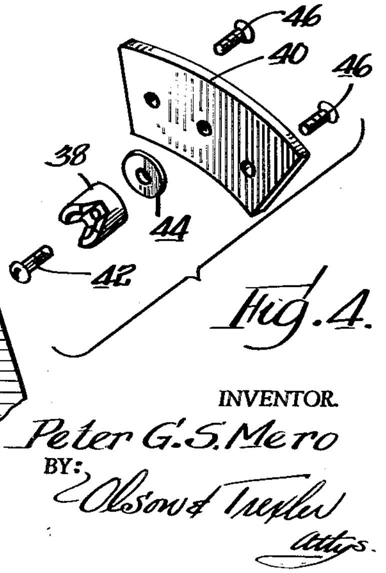
Fig. 4 is an exploded view in perspective of the elements for fastening the individual magnets of the pulley.
Figures 5, 6, 7, 8:
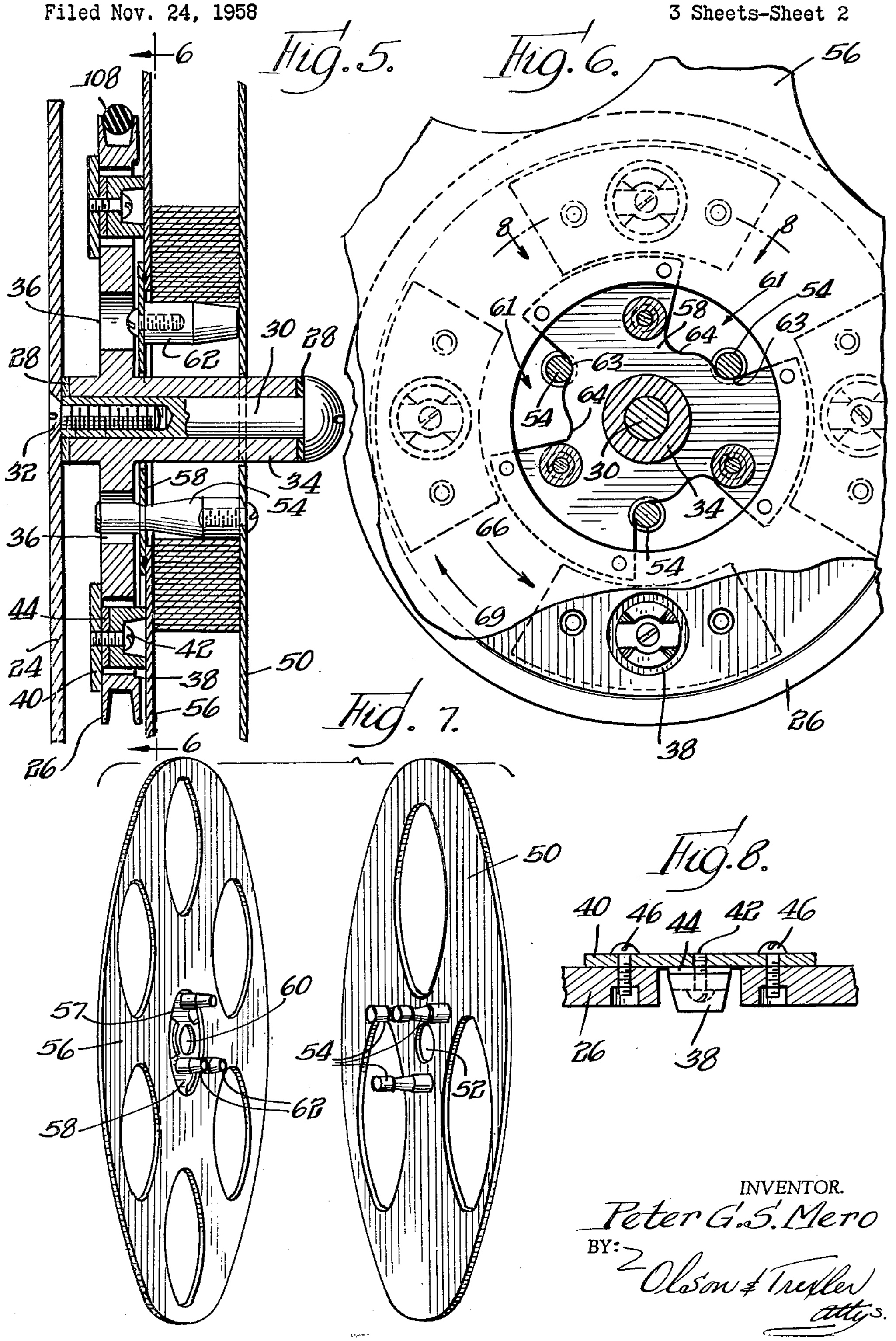
Fig. 5 is an enlarged view through the section 5—5 of Fig. 1.
Fig. 6 is a partially cut away view of the section 6—6 of Fig. 5.
Fig. 7 is a perspetcive view of the two reel flanges.
Fig. 8 is a detailed view through the section 8—8 of Fig. 6.

Referring now in detail to the drawings, and first to Figs. 1 and 2, there is a stand or support generally shown at 20 having a base portion 22 and an upright portion 24. To the upright 24 is attached a pulley 26, shown also in Figs. 3 and 5, rotatably mounted as by washers 28, a headed shaft 30 and a mounting screw 32. As best shown in Fig. 5, shaft 30 is internally threaded to cooperate with screw 32.

In assembling pulley 26 to upright 24, shaft 30 enters a hollow post 34 attached rigidly to or being integral with pulley 26. Furthermore, pulley 26 is provided with a number of circular slots 36 for purposes which will be brought out hereinbelow.

A number of cup-shaped magnets 38, preferably permanent magnets, is affixed to pulley 26 as by being attached to a bracket 40 through a bolt 42 and a lock washer 44. Bracket 40 is, in turn, fastened to pulley 26 with bolts 46. This construction is best shown in Figs. 3, 4, 5 and 8. The magnets 38 are employed in securing a reel 48 to pulley 26.

Reel 48, as shown in Figs. 1, 2 and 5–7, is fashioned from a reel half or flange 50 having a central hole 52 and having fastened to it, as by screws, a number of locking pins 54. Flange 50 cooperates with a second reel half or flange 56 in forming the reel 48, the reel flanges being appropriately spaced-apart to accommodate the width of tape to be wound. Flange 56 is provided with a central hole 57 and a notched washer 58 having a central hole 60. Hole 60 joins with hole 52 in providing a channel into which the post 34 may be inserted. Washer 58 may be a separate part secured about hole 57, or it may be integral with flange 56 in which latter case hole 57 may be eliminated.

Washer 58 is adapted to cooperate with locking pins 54 in providing a twist-lock arrangement for assembling flange 50 to flange 56. Flange 56 is provided with a number of spacer pins 62 fastened securely to the washer 58 in order to insure substantial parallelism between the flange 50 and the flange 56. Flange 56 is furthermore preferably fashioned from a magnetic material, such as low-carbon steel, so that it may be attracted by magnets 38.

Specifically, with regard to the twist-lock arrangement, washer 58 is provided with a number of substantially W-shaped notches 61, each having a shallow indentation 63 and a deep indentation 64. The locking pins 54 enter and pass freely through the deep indentations 64; but a rotation of flange 56 relative to flange 50 in the direction of arrow 66 causes the tapered mid-portions of pins 54 to ride up over the humps joining indentations 64 and 63 until the pins come to rest in the shallow indentations 64. In this latter position, pins 54 are restrained from axial movement by their enlarged free ends which extend beyond the tapered mid-portions and overlap the edge of washer 58.

Since three points are known to determine a plane, pins 54 and spacer pins 62 are preferably provided in numbers of at least three. Additionally, flanges 50 and 56 may be cored in order to reduce the weight of reel 48 and thereby reduce momentum forces. Furthermore, it should be noted that the locking pins 54 enter the slots 36 in pulley 26, thereby aiding in securing reel 48 to pulley 26. Reel 48 is ordinarily mounted to rotate in the direction of arrow 68.

A motor housing generally shown at 70 in Figs. 1, 2 and 9–12 is attached to brackets 72 as by screws 74. Brackets 72 are, in turn, fastened to upright 24 by screws 76. Housing 70 contains an electric motor shown generally at 78, which is preferably an A.C. motor, fastened to upright 24 as by rivets or other suitable means. Motor 78 is connected to a suitable source of power, not shown, by a cable 80 making electrical connections at points 82 and 84.

The rotor 86 of motor 78 is adapted to be shiftable axially as well as to be rotatable. Motors having rotors so arranged are well known and are readily available commercially. Furthermore, the rotor shaft 88 is blocked or is left free to move axially as will be brought out more fully hereinbelow. Rotor shaft 88 is biased in a direction generally out of the field of stator 90 by a spring 92 and is further journalled in bearings 94 and 96.

Rotor shaft 88 enters, adjacent to bearing 96, a box 98 containing a gear train, not shown, shaft 88 being provided with a pinion gear, not shown, in order to selectively mesh with the gear train. The gear train is provided for purposes of speed reduction.

The gear train includes an output shaft 104 attached to a pulley 106, pulley 106 being adapted to drive pulley 26 through a drive belt 108. Pulley 106 is advantageously arranged to have a smaller diameter than pulley 26 in order to provide additional speed reduction.

Figures 9, 10, 11, 12, 13:
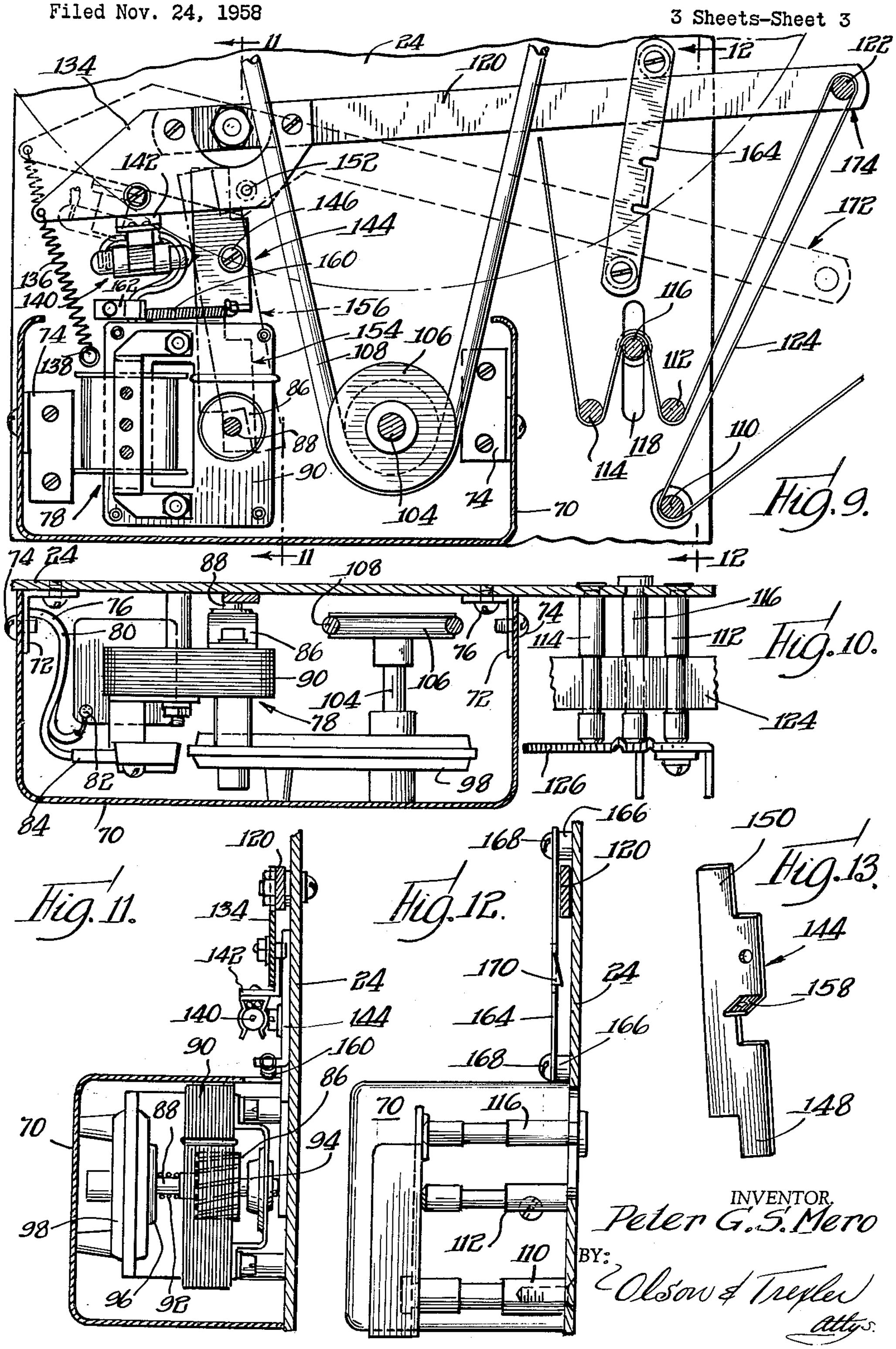
Fig. 9 is an enlarged view partially in section of the drive means and tape threading arrangement.
Fig. 10 is a view through the section 10—10 of Fig. 1.
Fig. 11 is a view through the section 11—11 of Fig. 9.
Fig. 12 is a view through the section 12—12 of Fig. 9.
Fig. 13 is a perspective view of the motor shaft return lever.

In order to develop a suitable tension in the tape during winding, a number of fingers 110, 112 and 114 is securely fastened to upright 24 according to the configuration shown in Fig. 9. Also a finger 116 is adjustably fastened between finger 112 and finger 114 as by being positionable in slot 118. Furthermore, an arm 120 is pivotally mounted to upright 24 and carries thereon a finger 122, finger 122 cooperating with fingers 110, 112, 114 and 116 in defining a path for tape 124 as shown best in Fig. 9. The length of the several fingers is preferably determined in accord with the width of the tape to be wound.

A plate 126 is swingably mounted to the otherwise free end of finger 110 in order to permit restraining tape 124 from sliding off the several fingers. Plate 126, shown in Figs. 1 and 10, has a pair of outwardly formed ribs 128 for constraining therebetween the finger 116 when plate 126 has been swung into position 130, shown in solid outline in Fig. 1, wherein plate 126 blocks the otherwise free ends of the several fingers. Plate 126 may also be swung into an unblocking position 132 shown in dotted outline.

A bracket 134 is affixed to the arm 120 generally as shown. The arm 120 is normally biased by a spring 136 against the tension in tape 124, spring 136 being affixed between bracket 134 and a rivet 138 affixed to upright 24.

A switch generally shown at 140, which may take the form of a mercury switch, it attached to bracket 134 by an angle member 142, switch 140 being interposed between the source of electrical energy and motor 78 in order to control the operation of the motor. Switch 140 energizes and deenergizes motor 78 in response to the position taken by arm 120, which position is determined by the tension in tape 124, accordingly as will be brought out more fully hereinbelow.

There is pivotally affixed to upright 24, a motor shaft return lever 144, by means of screw 146. Furthermore, lever 144 is provided with a leg 148 adapted to block rotor shaft 88 in a selective manner. Lever 144 is also provided with a leg 150 adapted to cooperate with a post 152 formed by a nut-and-bolt arrangement. Post 152 is affixed to bracket 134 in order that arm 120 may direct leg 148 into a shaft blocking position 154, shown in solid and invisible outline in Fig. 9, and a shaft unblocking position 156, shown in broken outline in Fig. 9. Lever 144 has an upraised position 158, best shown in Fig. 13, to which is affixed one end of a spring 160. The other end of spring 160 is attached to an angle member 162 which is, in turn, affixed to upright 24 as by riveting. In this manner, spring 160 biases lever 144 into its shaft blocking position 154, which position permits normal on-off operation of motor 78 without disengaging motor 78 from the gear train.

Additionally, there is provided a guide 164 attached in spaced-apart manner to upright 24 as by employing tubular spacers 166 cooperating with screws 168. Guide 164 has incorporated therein a catch 170 adapted to restrain arm 120 in a free-wheeling position shown at 172 in dashed outline in Fig. 9, arm 120 being permissive of manual movement into and out of this position. When are 120 is constrained in this free-wheeling position, post 152 conducts motor shaft return lever 144 into its shaft unblocking position 156, switch 140 deenergizes motor 78, and spring 92 shifts rotor 86 out of alignment with stator 90. Thus, the gear train is disconnected from the motor 78. Arm 120 ordinarily takes a motor-operating position 174, shown in solid outline in Fig. 9, in which position arm 120 moves within the confines established by guide 164.

For purposes of providing a complete understanding of the invention, it is advantageous to provide at this juncture a functional description of the mode of operation of the component parts.

Consider now a printing telegraphy system in which a small quantity of tape has passed through the perforator or transmitter. In order to prepare the tape winder for use, the free end of the tape is threaded over, in turn, finger 110, finger 122, finger 112, finger 116 and finger 114, this being done with plate 126 rotated so as to reveal the several fingers. When motor 78 is connected to its source of power, it is also proper during the threading operation to have arm 120 in the free-wheeling position 172 so that motor 78 is deenergized by means of switch 140. In this manner, motor 78 may be prevented from operating pulley 26 during the threading operation.

After the tape has been threaded about the several fingers and the plate 126 has been rotated to block the otherwise free ends of the fingers, the end of the tape may be secured to the pins 54 of reel 48 by twining thereamong or, alternatively, to a cardboard core surrounding the pins 54 as by employing pressure sensitive tape.

In order to facilitate affixing tape to the reel 48, reel 48 may be disassembled by rotating flange 56 relative to flange 50 in the direction of arrow 69, releasing the locking pins 54 from the twist-lock arrangement provided with washer 58. Thus, reel 48 may be disassembled in order to apply a cardboard core about the locking pins 54 or to twine the tape about the pins. After the tape is affixed, pins 54 may be reinserted in the deep indentations 64 of washer 58 and the reel flanges rotated relative to each other in order to secure the twist-lock.

After the tape has been affixed to the reel and the reel reassembled, the reel may be mounted to the post 34 as by inserting post 34 in the holes 52 and 60 provided for that purpose. To complete the mounting of the reel, the free ends of the pins 54 must be positioned to enter the slots 36 in pulley 26. In this manner, reel 48 is prevented from rotating relative to the pulley 26 by the engagement of the pins 54 and the slots 36. Reel 48 is further held in proper position parallel with pulley 26 by the action of the magnets 38.

In order to complete preparation of the tape winder for use, slack in the tape may be taken up by manually rotating the reel 48 while arm 120 is in the free-wheeling position. The position of pin 116 may be adjusted in the slot 118 in order to adjust tension in the tape. When all final adjustments are made, arm 120 may be manually released to the operating position.

In operation then, when tape is stepped out of the perforator or transmitter, tension on the tape in the tape winder decreases; the arm 120 moves upward in response to the bias of spring 136; and switch 140 operates to drive motor 78. Motor 78, through the gear train, pulley 106, belt 108, and pulley 26, rotates reel 48 so as to wind the tape 124. A quantity of tape is shown wound on reel 48 in Fig. 5. As the winding rate approaches and then exceeds the rate at which tape is being stepped out of the transmitter, tension in the tape will increase slightly and arm 120 will be drawn downward. As arm 120 continues downward, switch 140 will operate to deenergize motor 78; and winding of the tape on the reel 48 will cease. In this manner, arm 120 will, in response to tension on the tape, hunt about the position established by the on-off point of switch 140. Accordingly, only slight variations in winding tension will be encountered.

After a full roll of tape has passed through the transmitter and has been wound on reel 48, arm 120 may be manually retracted into the free-wheeling position. In this position, post 152 will have rotated lever 144 into its rotor blocking position 154; and with the motor 78 deenergized through switch 140, rotor shaft 88 will disengage its pinion gear from the gear train as by a lateral movement encouraged by spring 92. With motor 78 disengaged from the gear train and consequently from pulleys 106 and 26, reel 48 may be removed from the winder apparatus as by being pulled off axially. The reel may then be disassembled as described above and the wound roll of tape removed for storage.

The specific example herein shown and described is illustrative only. Various changes in structure will no doubt occur to those skilled in the art, and will be understood as forming a part of this invention insofar as they fall within the spirit and scope of the appended claims.

The invention is claimed as follows:

1. Apparatus for winding tape comprising: a reel; a stand; mounting means for rotatably mounting said reel to said stand; drive means for rotating said reel; and tape guiding means defining a tape path, said guiding means including a plate and a plurality of tensioning fingers, said plate being pivotally mounted on the free end of one of said plurality of fingers and having a channel adapted to accept another of said fingers in such a position that said plate prevents the tape from slipping from the free ends of said plurality of fingers.

2. Apparatus for winding tape comprising: a reel fashioned from a magnetic material and having a central opening and a plurality of pins disposed about said opening, said pins forming a core for receiving tape thereabout; a stand; mounting means for rotatably mounting said reel to said stand, including a post adapted to engage the central opening of said reel and magnet means for holding said reel relative to said post; drive means including power transmitting means connected to said mounting means and a motor; and tape guiding means including a plurality of fixed fingers, an adjustable finger, and an arm pivotable in response to winding tension in the tape, a finger carried by said arm, and a switch secured to said arm for intermittently operating said motor, wherein said fixed finger, said adjustable finger and the finger carried by said arm define a tape path, said guiding means further including a latch for restraining said arm in a motor-operate position and a free-wheeling position, in which latter position said motor is disengaged from said power transmitting means.

3. Apparatus for winding tape comprising: a reel including two reel halves fashioned from magnetic material, each reel half having a central opening and a plurality of pins disposed about said opening, said pins being employed in joining said reel halves in spaced-apart relationship, said pins further forming a core for receiving tape thereabout; a stand; mounting means for rotatably mounting said reel to said stand, including a post adapted to engage a central opening in said reel and magnet means for holding said reel relative to said post; drive means including power transmitting means connected to said mounting means and an electric motor; and tape guiding means including a plurality of fixed fingers, an adjustable finger, an arm pivotable in response to winding tension on the tape, a finger carried by said arm, and a mercury switch secured to said arm for intermittently operating said motor wherein said fixed finger, said adjustable finger, and the finger carried by said arm define a tape path, said guiding means further including a latch for restraining said arm in a motor-operate position and a free-wheeling position, in which latter position said motor is disengaged from said power transmitting means.

4. Apparatus for winding tape comprising: a reel including two reel halves fashioned from steel, each reel half having a central opening and a plurality of pins disposed about said opening, said pins being employed in joining said reel halves in spaced-apart relationship, said pins further forming a core for receiving tape thereabout; a stand; mounting means for rotatably mounting said reel to said stand, including a post adapted to engage the central openings of said reel halves and magnet means for holding said reel relative to said post; drive means including power transmitting means connected to said mounting means and an electric motor having a rotor which is shiftable axially in order to selectively engage said power transmitting means; tape guiding means including a plurality of fixed fingers, an adjustable finger, an arm pivotable in response to winding tension of the tape, a finger carried by said arm, and a mercury switch secured to said arm for intermittently operating said motor, wherein said fixed fingers, said adjustable finger, and the finger carried by said arm define a tape path, said guiding means further including a latch for restraining said arm in a motor-operate position and a free-wheeling position, in which latter position said motor is disengaged from said power transmitting means.

5. Apparatus for winding tape comprising: a reel including two reel halves fashioned from steel, each reel half having a central opening and a plurality of pins disposed about said opening, said pins being employed in joining said reel halves in spaced-apart relationship, said pins further forming a core for receiving tape thereabout; a stand; mounting means for rotatably mounting said reel to said stand, including a post adapted to engage the central openings of said reel halves and a plurality of permanent magnets arranged symmetrically with said post for holding said reel relative to said post; drive means including power transmitting means connected to said mounting means and an electric motor having a rotor which is shiftable axially in order to selectively engage said power transmitting means; tape guiding means including a plurality of fixed fingers, an adjustable finger, an arm pivotable in response to winding tension on the tape, a finger carried by said arm, and a mercury switch secured to said arm for intermittently operating said motor, wherein said fixed fingers, said adjustable finger and the finger carried by said arm define a tape path, said guiding means further including a latch for restraining said arm in a motor-operate position and in a free-wheeling position, in which latter position said motor is disengaged from said power transmitting means.

6. A tape winder for use in printing telegraphy systems comprising: a support; a pulley rotatably mounted to said support; a post coaxially affixed to said pulley; a first reel flange having a central hole and a plurality of locking pins disposed symmetrically about said hole; a second reel flange having a central hole, a plurality of spacer pins disposed symmetrically about said hole, and a notched washer establishing a twist-lock arrangement with said locking pins whereby said first flange and said second flange are joined together forming a reel, the hole in said second reel flange cooperating with the hole in said first reel flange to accept said post for mounting said reel to said pulley; a motor adapted to rotate said pulley intermittently; a plurality of fingers extending from said support parallel with said post; an arm pivotally mounted to said support and having fastened thereon a finger adapted to cooperate with said plurality of fingers in defining a tape path; and a switch carried by said arm for intermittently actuating said motor.

7. A tape winder for use in printing telegraphy systems comprising: a support; a pulley having a plurality of radially spaced slots, rotatably mounted to said support; a post coaxially affixed to said pulley; a first reel flange having a central hole and a plurality of locking pins disposed symmetrically about said hole, the free ends of said locking pins being adapted to engage the slots of said pulley; a second reel flange having a central hole, a plurality of spacer pins disposed symmetrically about said hole, and a notched washer establishing a twist-lock arrangement with said locking pins whereby said first flange and said second flange are joined together forming a reel, the hole in said second reel flange cooperating with the hole in said first reel flange to accept said post for mounting said reel to said pulley; power transmitting means connected to said pulley; a motor adapted to rotate said pulley intermittently through said power transmitting means; a plurality of fingers extending from said support parallel with said post; an arm pivotally mounted to said support and having fastened thereon a finger adapted to cooperate with said plurality of fingers in defining a tape path; and a switch carried by said arm for intermittently actuating said motor.

8. A tape winder for use in printing telegraphy systems comprising: a support; a pulley having a plurality of radially spaced slots, rotatably mounted to said support; a post coaxially affixed to said pulley; a first reel flange having a central hole and at least three locking pins disposed symmetrically about said hole, the free ends of said locking pins being adapted to engage the slots of said pulley; a second reel flange having a central hole, at least three spacer pins disposed symmetrically about said hole, and a notched washer establishing a twist-lock arrangement with said locking pins whereby said first flange and said second flange are joined together forming a reel, the hole in said second reel flange cooperating with the hole in said first reel flange to accept said post for mounting said reel to said pulley; a plurality of permanent magnets fastened to said pulley for securing said reel; power transmitting means connected to said pulley; a motor adapted to rotate said pulley intermittently through said power transmitting means; a plurality of fingers extending from said support parallel with said post; a spring biased arm pivotably mounted to said support and having fastened thereon a finger adapted to cooperate with said plurality of fingers in defining a tape path; a switch carried by said arm for intermittently actuating said motor; and a plate pivotably mounted on the free end of one of said plurality of fingers to block slippage of the tape from said plurality of fingers.

References Cited in the file of this patent

UNITED STATES PATENTS

| | | |
|---|---|---|
| 754,117 | Bedworth | Mar. 8, 1904 |
| 2,188,169 | Weidemeier | Jan. 23, 1940 |
| 2,334,040 | Schellens | Nov. 9, 1943 |
| 2,489,319 | Nave et al. | Nov. 29, 1949 |
| 2,621,864 | Smith | Dec. 16, 1952 |
| 2,746,691 | Hoad | May 22, 1956 |
| 2,827,245 | Kleinschmidt et al. | Mar. 18, 1958 |